United States Patent [19]
Garcera et al.

[11] Patent Number: 5,415,772
[45] Date of Patent: May 16, 1995

[54] MODULE FOR FILTERING, SEPARATING, PURIFYING GASES OR LIQUIDS, OR FOR CATALYTIC CONVERSION

[75] Inventors: Daniel Garcera, Tarbes; Edouard Toujas, Bazet; Jacques Gillot, Laloubere, all of France

[73] Assignee: Societe des Ceramiques Techniques, Bazet, France

[21] Appl. No.: 970,787

[22] Filed: Nov. 3, 1992

[30] Foreign Application Priority Data

Oct. 20, 1992 [FR] France .................... 92 12535

[51] Int. Cl.6 ............... B01D 35/00; B01D 53/34
[52] U.S. Cl. ..................... 210/232; 55/502; 55/523; 55/DIG. 30; 210/500.1; 210/502.1; 210/510.1; 422/179
[58] Field of Search ............. 210/232, 321.87, 323.2, 210/445, 446, 497.01, 500.1, 500.26, 502.1, 503, 501, 510.1; 55/502, 523, DIG. 30; 422/179; 248/604, 581, 610, 612, 626

[56] References Cited

U.S. PATENT DOCUMENTS

3,065,941 11/1962 Loftis .................... 248/604
3,817,714 6/1974 Wiley .................... 422/179
3,945,803 3/1976 Musall et al. ............ 422/179
4,004,888 1/1977 Musall et al. ............ 422/179
4,145,394 3/1979 Abthoff et al. ........... 422/179
4,155,980 5/1979 Santiago et al. .......... 422/179
4,163,041 7/1979 Gaysert ................... 422/179
4,353,873 10/1982 Noritake et al. .......... 422/179
5,143,614 9/1992 Soria et al. ............. 210/321.61

Primary Examiner—Sun Uk Kim
Attorney, Agent, or Firm—Sughrue, Mion, Zinn, Macpeak & Seas

[57] ABSTRACT

The present invention relates to a module for filtering, separating, purifying gases or liquids, or for catalytic conversion, including:
a substantially cylindrical housing (13),
at least one rigid element (4) of which at least one end (5) is substantially cylindrical and whose axis is parallel to that of the housing (13),
at least one elastically deformable metal part in the form of a ring (6), fixed firstly to the housing (13) and connected secondly to the end (5) of the element (4), characterized in that the joint between the ring (6) and the end (5) of the element (4) is a hoop fitting.

7 Claims, 8 Drawing Sheets

MODULE FOR FILTERING, SEPARATING, PURIFYING GASES OR LIQUIDS, OR FOR CATALYTIC CONVERSION

BACKGROUND OF THE INVENTION

The present invention concerns a module for filtering, separating, purifying gases or liquids, or for catalytic conversion, comprising within a housing at least one rigid treatment element for purification or having a membrane for separating, filtering, or catalytic conversion. Such a module may be used for filtering, separating or purifying liquids but it is especially applicable to filtering or purifying gases used for example in the manufacture of semiconductors.

This type of module comprises:
a generally cylindrical metal envelope or housing, comprising one part or a plurality of parts assembled by fused metal bonding;
one or more rigid treatment elements, of tubular shape or of multi-channel type, such as is described in U.S. Pat. No. 4,069,157, or of honeycomb type, such as is described in U.S. Pat. No. 4,781,831;

In applications for filtering or purifying gases to be used especially for the manufacture of semiconductors, the module assembly must be able to withstand:
thermal stresses arising from use (thermal cycling and degassing for example),
mechanical stresses in withstanding pressure, such as for example in treating a gas which can be at several hundreds of bars,
corrosion by the treated fluid, which may be for example HCl, a chloride, a bromide or another corrosive gas used in producing integrated circuits, especially in etching.

Moreover the requirements for ultra-cleanliness in the electronics industry require that there shall be no risk of polluting particles being thrown out by the module.

Such a module should be capable of functioning at temperatures going from ambient temperature to several hundreds of degrees Celsius, whether for treating the fluid or for cleaning or regeneration of the treatment element or elements. Differences in expansion appear between the element and the housing with the effects of variations in temperature and can amount to several millimeters when the treatment element has a length in the order of a meter. The element-to-housing connection has to be sufficiently flexible to be able to deform in such a way as to compensate for these differences in expansion.

In some known assemblies, the element-to-housing connection can be effected by way of a polymer or elastomer gasket, for example of PTFE, EPDM, a silicone, etc. In this case the elasticity of the gasket is used to compensate for the differences in expansion between the element and the housing.

This solution is not suitable for high temperature uses, for the obvious reasons of physical-chemical and mechanical degradation of the polymer or elastomer. Moreover these materials age and creep with time.

Modules are also known in which the connection of the element or elements to the housing is effected through one or more metal parts or rings located at the ends of the element. Each of these parts is fixed securely both to the metal envelope and also to the end of a treatment element, by brazing or by glass (or enamel). These solutions suffer from major problems.

Firstly, brazing does not usually provide good corrosion resistance with gases such as HCl, chlorides, bromides, etc., which are used at present for etching integrated circuits.

Secondly, glasses which have good corrosion resistance are in general terms those which do not comprise components in their composition which fuse at a low temperature. These glasses thus melt at high temperatures. Assembly of the module by means of these glasses requires the module assembly to be raised to a high temperature, which is not always possible because of the risk of damaging the treatment element (filter layer, catalyst, etc.), or the metal of the ring. Moreover, in order to obtain a good bond between the glass and the metal of the housing or of the ring, it is generally necessary firstly to oxidize the metal surface, which is incompatible with the ultra-cleanliness imposed in applications to the manufacture of semiconductors for example. Finally, this glass solution is costly, because it involves large heating means and a method that is complex.

SUMMARY OF THE INVENTION

The object of the invention is to provide a filter module which can be used at high temperatures without risk of pollution and which is capable of resisting stresses of a thermal, mechanical or chemical nature applied thereto.

The present invention provides a filter module for filtering, separating, purifying gases or liquids, or for catalytic conversion, comprising:
a substantially cylindrical metal envelope or housing,
at least one rigid treatment element made from a dense or porous material selected from a ceramic, carbon, sintered glass and sintered metal, of which at least one of the ends is substantially cylindrical and whose axis is parallel to that of the envelope,
at least one metal part in the form of an elastically deformable ring, fixed firstly to the housing and connected secondly to said end of said element, the module being characterized in that the connection between said ring and said end of said element is a thermal or mechanical hoop fitting, said ring being hoop fitted on said end or vice versa (inverse hoop fitting).

The hoop fitting consists in sleeving a part in a hoop whose inner diameter is less than the outer diameter of the part to be hooped by an amount called the shrinkage allowance. This manner of connection by hoop fitting or shrink fitting has the advantage of being free from any organic or inorganic bonding medium.

Thermal hoop fitting consists for example in sleeving the element in the ring after expanding this by heating. Mechanical hoop fitting, or force fitting, consists for example of cold forcing the element into the ring with the aid of a press.

The advantage of thermal hoop fitting of the element in the ring is that clamping exists so long as the temperature of use of the module remains below the temperature of relaxation of the metal (i.e. the temperature below which it remains elastic) and below the temperature (if there be one) at which the thermal expansion of the metal and of the end of the element cancels out the shrinkage allowance.

In a variant, the connection between the said element and the said ring is effected by mechanical hoop fitting, or force fitting of Morse tapers. The active element, whose shape at the end is slightly tapered, like a Morse taper (amount of taper ≦5%), is connected to the ring, which is made with the same shape.

The said ring is preferably deformable in an elastic manner such that is can deform slightly parallel to the longitudinal axis of the module, behaving like a metal bellows. In the case in which the treatment element is formed from a material of mechanically fragile nature (a ceramic, glass, carbon, etc.), mounting with a ring in the form of a bellows protects the element against possible shocks to the housing, by virtue of the elasticity of the ring.

The said ring is made from a material selected from a stainless steel, a titanium alloy of type TA6V of the company PECHINEY, a nickel-rich alloy such as N42 or Dilver (P0 or P1) of the company IMPHY, or Kovar of the company WESTINGHOUSE, or indeed a Hastelloy. These alloys are selected because of their coefficients of expansion, their high stress relaxation temperatures and their resistance to corrosion.

In a first embodiment, the said ring is fixed to the said housing by welding effected by fitting the outer edge of said ring in a machined seat in the wall of said housing and partial fusion of the thickness of the wall of said housing and of the outer edge of said ring, without a region of fused metal appearing at the inner surface of said housing.

The ring and the part or parts of the housing are preferably assembled by TIG (tungsten inert gas) welding. The tungsten electrode and the assembly of parts to be welded are moved relative to one another by rotational movement about the axis of the housing to be assembled, which enables the depth of the fused region (in the order of 4 mm) to be controlled relative to the thickness of the wall (5 mm to 7 mm). A wide weld bead (about 0.5 mm) is obtained.

In a second embodiment, the said ring is fixed to the said housing by welding effected by fitting the outer edge of said ring in a machined seat in the wall of said housing and partial fusion of the thickness of the wall of said housing, without fusion of the outer edge of said ring but with gripping of said edge by contraction of the fused region, and without a region of fused metal appearing at the inner surface of said housing.

The gripping by contraction of the weld ensures a joint between the housing and the ring which is both mechanically very solid and absolutely impervious.

This method has the advantage that, to assemble the module, two welds are sufficient if there are two rings, or one weld only if there is only one ring.

The joint between the ring and the housing could also be effected by rolling in or else by hoop fitting the housing on the ring.

In a variant, at least one of the ends of said element is connected to said ring through a connecting piece fixed to said element, said connecting piece being of substantially cylindrical shape and made from a material selected according to the function of the said connecting piece, from a porous material and a dense material.

The presence of the connecting piece is necessary in the following cases:

when the end of the treatment element cannot be put directly in communication with the outlet opening of the module, either because the element is to be closed completely by a solid connecting piece, or because the element is to be partially closed in order to create a preferential flow path for the fluid through the lateral walls, and a micro-porous connecting piece is used for example, or else to adapt the inner shape of the element to connect the internal channels with one of the external inlet or outlet openings of the module with the aid of a tubular connecting piece;

when the mechanical characteristics of the element are inadequate for making a hoop fitting: the connecting piece is then formed by a dense or porous material, of the same or a different nature than that of the element, having sufficient mechanical strength to allow the hoop fitting;

when the outer shape of the element is not compatible with the hoop fitting operation: in this case the connecting piece should have a cylindrical or slightly tapered seat corresponding to the shape of the ring.

The connecting piece is fixed on the treatment element either by a connection without any bending material, (thermal hoop fitting, force fitting, rolling in, etc.), or with the aid of a glass or enamel which is fusible at high temperature. In this case the use of a glass is possible without damaging the element because the connection between the element and the connecting piece is generally made before the element support is coated with a membrane or a catalytic material for example. Only a high temperature glass has the properties which make it usable at high temperatures without risk of pollution, and capable of withstanding the stresses of thermal, mechanical and chemical nature which are applied to the module.

In one improvement, the said element contains components which can react chemically with some constituents (for example impurities) of the fluid to be treated, in order to fix or neutralize these.

In a first embodiment, the said module comprises a multi-channel treatment element with a membrane of sterilizing type, with a hydrophobic surface and having a mean pore diameter less than or equal to 0.8 micrometers.

In a second embodiment, the said module comprises a treatment element formed from a porous material, carrying a connecting piece at each end of dense material of the same nature as said element, said connecting piece being connected by hoop fitting to a ring of an alloy selected from nickel-rich alloys, and said ring being welded to said housing of stainless steel, the interior of which is electro-polished.

In a third embodiment, the said module comprises a treatment element selected from the honeycomb type and the multi-channel type, of a dense material whose walls are coated with a catalytic material.

A module in conformity with the present invention has the advantage of being usable over a large temperature range and in particular at high temperatures (several hundreds of degrees Celsius), with or without thermal cycling. It also has the advantage of being free from any organic or inorganic bonding medium prone to be degraded with the passage of time or under the effect of thermal, mechanical or chemical stresses caused by the conditions of use.

Finally, another advantage of the module of the present invention is that its inner surface is free from material tending to fix and then release troublesome impurities, such as organic materials, water vapor or solid micro-particles which might possibly be contained in the gas to be treated. This advantage is especially valuable in applications where the module has to treat very pure gases.

A module of the invention is suitable for many applications in the electronics, chemical, pharmaceutical and food industries.

Other features and advantages of the present invention will appear in the course of the following description and from a reading of the examples, given by way of example and without limitation, and in the accompanying drawings.

DESCRIPTION OF PREFERRED EMBODIMENTS

Figure 1:
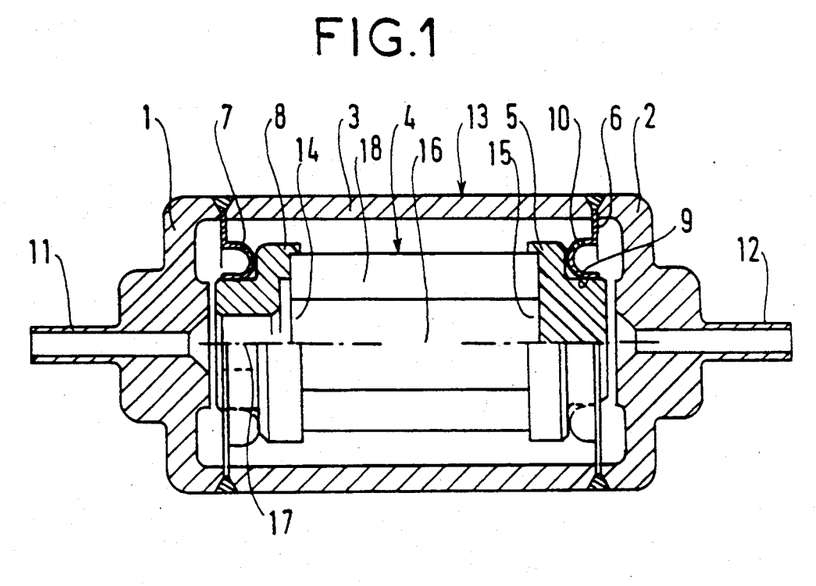
FIG. 1 shows a module of the invention in a schematic manner.

A filter module with a rigid element in conformity with the invention is shown in FIG. 1; it comprises:
- a cylindrical housing 13, made from a plurality of parts 1, 2 and 3, assembled by welding;
- a treatment element 4 of tubular shape, with an internal channel 16 bounded by a porous wall 18. The ends 14 and 15 of the element are provided with connecting pieces 5 and 8 having a cylindrical seat 9. The connecting piece 5 is solid and closes the internal channel 16 of the element 4, while the connecting piece 8 has an opening 17 on the axis of the internal channel;
- two metal parts 6 and 7, or rings, each of these parts being fixed rigidly in conformity with the invention firstly by hoop fitting to the connecting pieces 5 and 8 of the treatment element and secondly by welding to the housing 13. One of the two rings 6 has an opening 10 allowing the passage of fluid.

The inlet and outlet of the fluid to be treated takes place through openings 11 and 12 located on the axis of the channel 16, at each end of the module.

In this type of module, the passage of the fluid to be treated takes place from the outer lateral surface of the treatment element 4 towards the internal surface of the channel 16. The flow of the fluid takes place in the following manner: the fluid enters through the opening 12 at the end of the module, passes through the opening 10 in the ring 6, flows along the outer lateral surface of the element 4, passes through the wall 18 of the element 4, flows in the internal channel 16 towards the end 14 of the element 4, and leaves by the opening 17 and then the opening 11 at the other end of the module.

Figure 2:
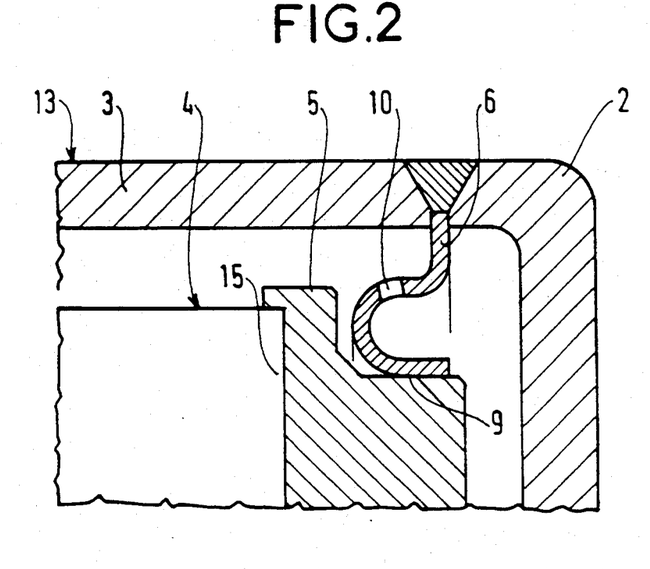
FIG. 2 is an enlargement of the housing-ring-element junction of the module shown in FIG. 1.

FIG. 2 is an enlargement of the housing-ring-treatment element connection of FIG. 1. The treatment element 4 comprises a central active part which carries the connecting piece 5 at its end 15. The ring 6 grips the cylindrical seat 9 on the connecting piece 5 by hoop fitting. The ring-housing junction is located in the lateral surface of the housing 13, at the junction of the parts 2 and 3.

Figure 3:
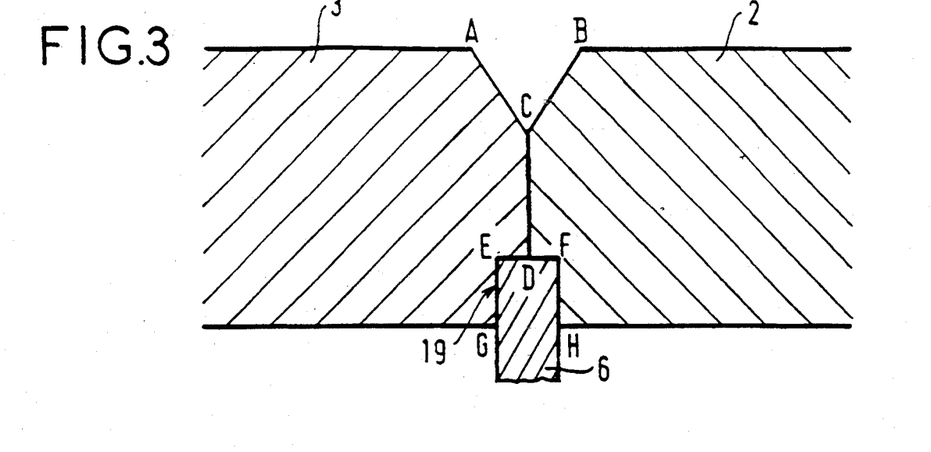
FIG. 3 shows the positioning of the ring and the parts of the housing of the module of FIG. 1 before welding.

The fixing of the ring 6 to the housing 13 is effected in the following manner (see FIGS. 3 and 4). A recess 19 is machined in the parts 2 and 3 of the housing 13 in such a manner that the outer edge GEFH of the ring 6 fits in exactly, as shown in FIG. 3 which shows the parts before welding.

Figure 4:
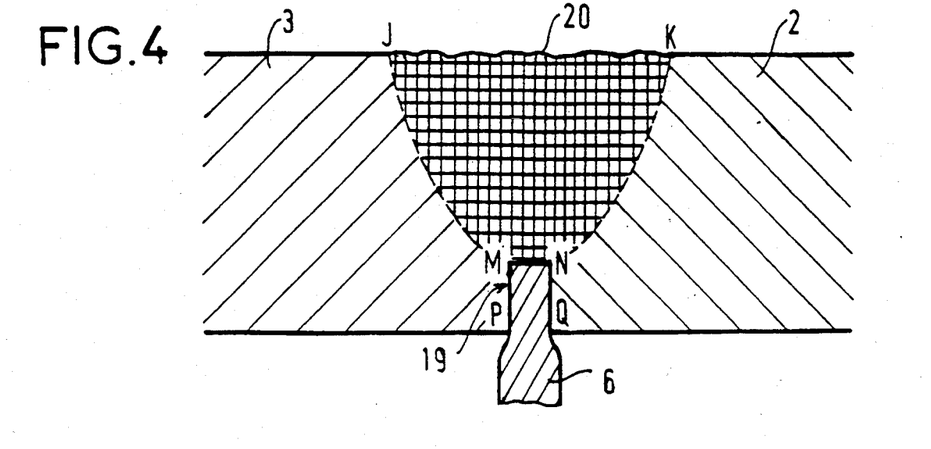
FIG. 4 shows the same parts as in FIG. 3 after welding.

Thus, as is shown in FIG. 4, the welding is effected from the outside in such a manner as to fuse part only of the thickness of the parts 2 and 3 of the housing 13 and to fuse only the outer edge EF of the ring 6. The fused region is shown as JMNK.

The solidification of the fused region takes place with contraction that grips the edge of the ring 6 hard, the thickness MN, or PQ, then becoming slightly less that the initial thickness EF, or GH of the ring 6. The gripping by the contraction of the weld ensures a connection between the housing 13 and the ring 6 which is both mechanically very solid and absolutely impervious.

The ring-housing connection is effected in such a way that the free surface 20 of the fused metal will not appear on the inside of the housing 13 during the welding operation. This method has the advantage both of preventing particles of metal being thrown off during this operation and ultimate throwing out of trapped particles and also of preventing modification of the state of the surface around the weld region by condensation of vaporized metal during the operation. Finally, this method allows the fused region to be restricted to the outer part of the thickness of the wall of the housing 13, say around 4 mm for a total wall thickness of 5 mm to 7 mm.

In the case in which the internal surface of the housing 13 has to have special characteristics (a surface which is electro-polished, passivated, chromium plated, etc.), these processes can be carried out on the parts before welding. After welding, the whole internal surface of the housing 13 still has these characteristics, while the housings of known modules, which are assembled by means of other procedures not comprising this ring 6, have a band of fused and then resolidified metal in their internal surface. With the exception of the treatment element 4, all the other components of the module can be made in such a way that all the internal surface of the module will be polished, electro-polished in the case of the metal parts, so as not to throw off solid particles, or else passivated in order to resist corrosion.

In one embodiment of the module:

the housing 13 is of 316L stainless steel electro-polished inside;

the single tube treatment element 4 is of gas filter type with a length of 2 to 20 cm, of a ceramic (alumina, $Al_2O_3$) coated with a layer of aluminum, with a mean pore diameter of 0.1 $\mu$m (Membralox P19-40) of SCT), and comprises a connecting piece 5 and 8 at the two ends respectively, of dense alumina bonded on by means of glass;

each ring 6 and 7 in the form of a bellows is made from an alloy comprising 41% nickel and 59% iron (N42 of the company IMPHY) and is welded to the housing 13 in accordance with the variant shown in FIG. 2.

The main characteristics are:

external diameter of the cylindrical seat of the ceramic connecting piece: 22.084 mm±0.002 mm coefficient of expansion of the alumina: $7.10^{-6}/°$ C.

surface roughness of the ceramic on the surface of the cylindrical seat: Ra=1.1 $\mu$m to 1.3 $\mu$m (Ra is the arithmetic mean spacing of asperities)

width of the cylindrical seat: 3 mm temperature of assembly of the alumina connecting piece: 20° C.

cold internal diameter before assembly of the cylindrical seat of the ring of N42:22.050 mm±0.003 mm hot internal diameter at the time of assembly of the ring of N42:22.090 mm surface roughness of the cylindrical seat of the ring: Ra=1.75 $\mu$m coefficient of expansion of the alloy N42:$5.10^{-6}/°$ C.

temperature of stress relaxation in the N42 alloy: greater than 500 C.

temperature of assembly of the ring: 350° C.

operating temperature of the module: around 450° C.

internal diameter of the cylindrical part of the housing: 43 mm external diameter of the cylindrical part of the housing: 53 mm external diameter of the ring before welding: 44.6 mm The parts 2 and 3 of the housing 13 and the ring 6 are assembled for welding as shown in FIG. 3, with GE=HF=0.8 mm and EF=GH=0.45 mm. After welding (FIG. 4), these values become PM=QN=0.6 mm and MN=PQ=0.37 mm.

The module has been subjected to evaluation tests, whose results are as follows:

force to separate the ring from the connecting piece at 20° C.: 3700 Newtons;

air leakage test: the interior of the housing being under vacuum, the module is subjected to thermal cycling, 50 cycles between 20° C. and 400° C.; this gives:

before thermal cycling: $5.10^{-6}$ atm.cm$^3$.s$^{-1}$ after thermal cycling: $6.10^{-7}$ atm.cm$^3$.s$^{-1}$ This difference between leakage values before and after thermal cycling is not significant.

test for retention of particles, measurement being made by counting the particles at the condensation region (CNC type 3022 of the company TISA): no passage of particles larger than 0.01 $\mu$m during a test of 5 minutes duration, with an air flow in the filter of 9 cm$^3$/second.

A module of the invention such as is shown in FIG. 1 can be used to effect:

filters for gases, especially corrosive gases, or for liquids used in the manufacture of semiconductors, especially integrated circuits;

purifiers for gases or liquids;

gas separators, purifiers or filters of larger sizes, comprising several elements with a length in the order of a meter;

fermentation vents allowing communication sealed to micro-organisms between the gas above the liquid in the fermentation vessel and the outside atmosphere. In this case, the active element is of multichannel type and the membrane should be of sterilizing type (mean pore diameter $\leq 0.8$ $\mu$m); it should preferably have a hydrophobic surface to avoid condensing water vapor blocking the flow of gas;

porous devices containing chemical media or catalysts retained in the pores and adapted to treat gases or liquids passing though the pores and reacting with these chemical agents or catalysts, especially for purifying the gases or liquids.

These filters or porous elements can be of membrane type, i.e. composed of a coarsely porous support and one or more layers of fine porosity.

Figure 5:
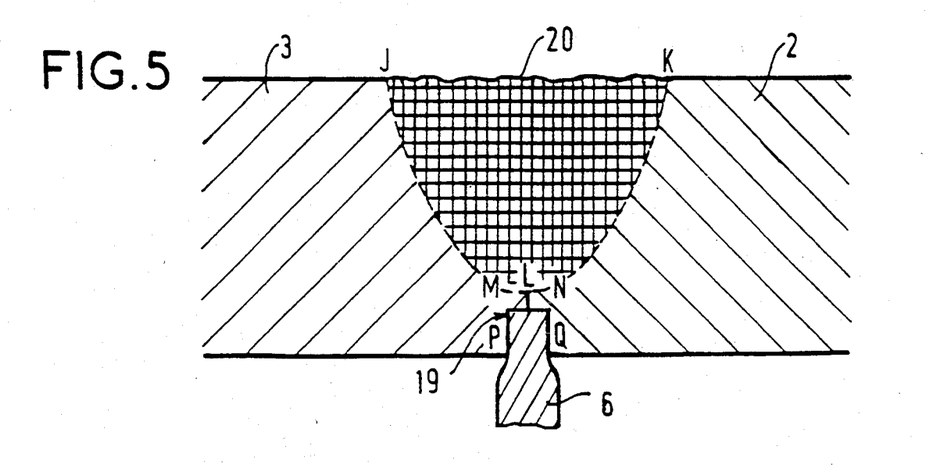
FIG. 5, like FIG. 4, shows a variant of the weld of the housing-ring connection of FIG. 3 after welding.

FIG. 5 shows another variant of the housing-ring connection. The welding is effected from the outside in such a way as to fuse only a part of the thickness of the parts 2 and 3 of the housing 13, without there being any fusion of the outer edge EF of the ring 6; the fused region is represented at JKL. The ring is held by the gripping due to the contraction of the fused region which results in the seat 19 tightening.

Figure 6:
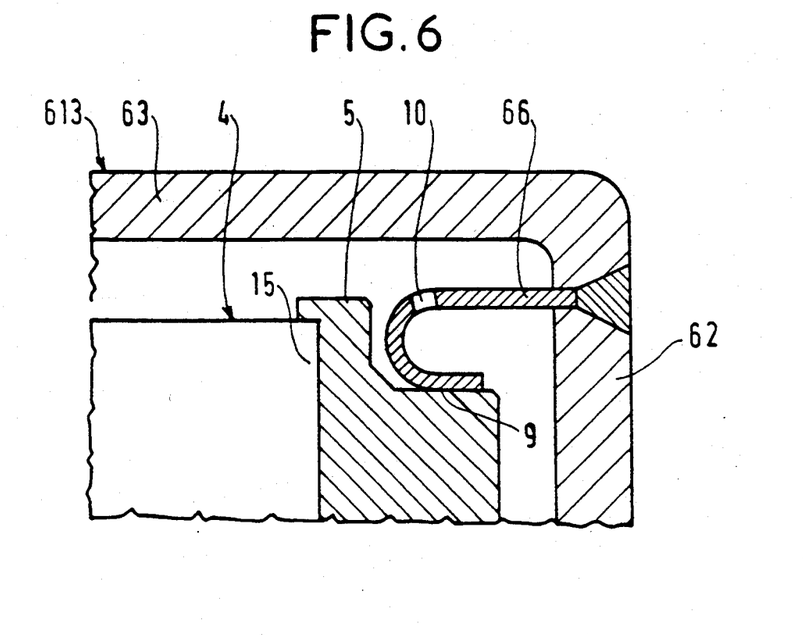
FIGS. 6 and 7, like FIG. 2, show two variants of housing-ring-element junction.
Figure 7:
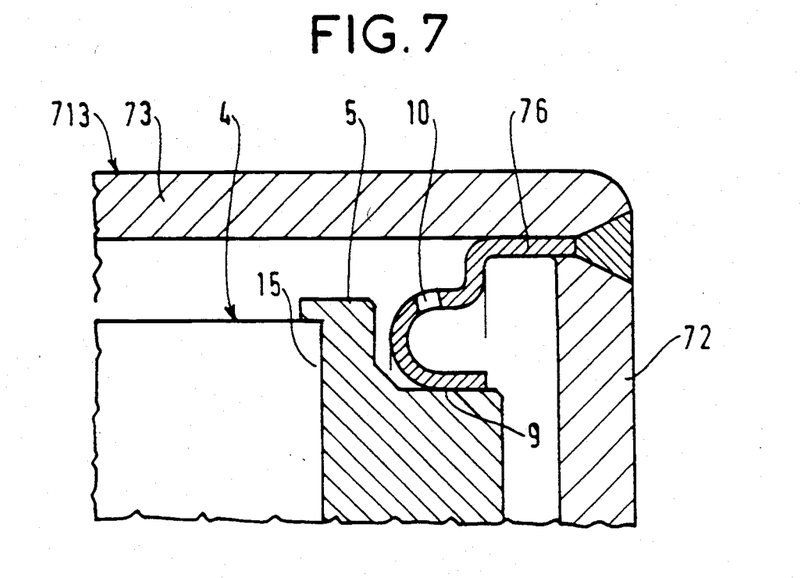

In FIGS. 6 and 7, variants in the position of the ring-housing joint are shown.

In a first variant, the ring 66 is welded to the transverse surface of the housing 613, at the end of the module, at the junction of parts 62 and 63 (FIG. 6).

In a second variant, the ring 76 is welded at the intersection of the transverse and lateral surfaces of the housing 713, at the junction of parts 72 and 73 (FIG. 7).

Figure 8:
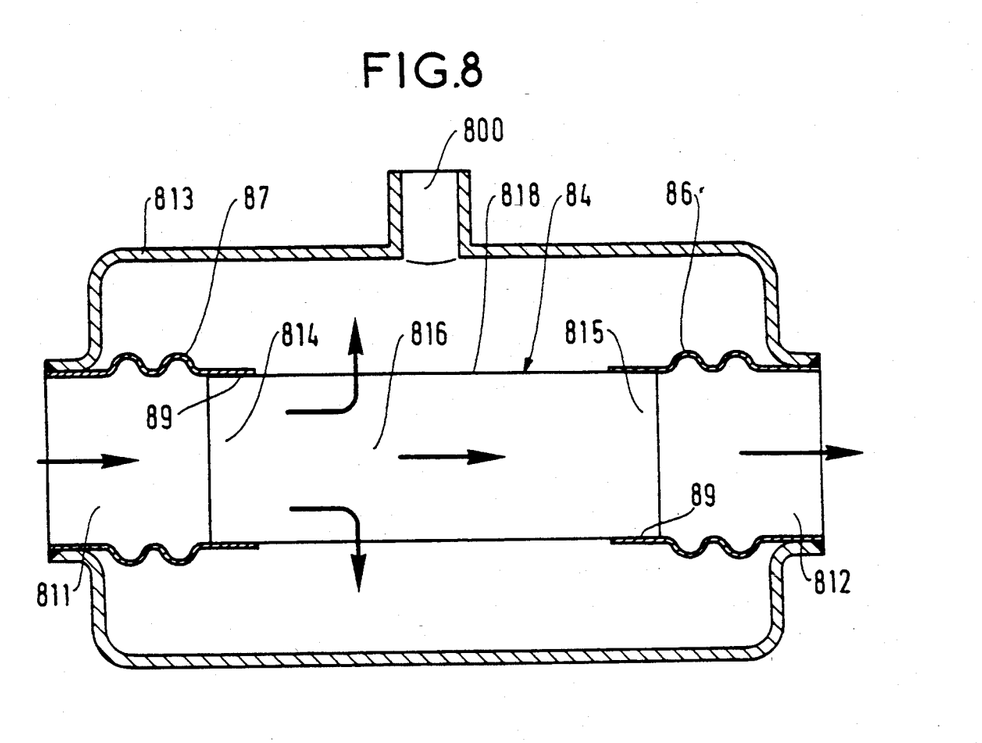
FIG. 8 shows a variant embodiment of a separating module of the invention using the principle of cross-flow filtering.

FIG. 8 shows a module comprising a treatment element 84 provided with an internal channel 816 bounded by a wall 818; each end 814 and 815 is connected to a respective ring 87, 86. The hoop fitting of the rings 86 and 87 is effected directly on the cylindrical seat 89 of the treatment element 84. The rings 86 and 87 are in turn welded to the transverse surface of the housing 813 in the region of the inlet and outlet openings 811 and 812 respectively on the axis of the module. Moreover, the housing 813 has a second outlet opening 800 located in its lateral face.

This type of module operates in accordance with the principle of cross-flow filtration. The fluid follows the path shown in FIG. 8 by arrows. The fluid to be treated enters the module through the opening 811 which is in communication with the end 814 of the element 84 and passes into the internal channel 816, whose surface is coated or impregnated with a separation membrane. There is thus separation of the fluid into two streams. One fraction of the fluid takes the following path: cross-flow over the inner surface of the internal channel 816 of the element 84, flow through the wall 818 of the element 84 after exchange at the membrane, flow along the outer lateral surface of the element 84, outlet through the opening 800 in the wall of the housing 813. Another part of the fluid flows towards the other end 815 of the element 84 and leaves the module through the opening 812.

The treatment element 84 is of cylindrical type of porous carbon, coated with a micro-porous membrane (mean pore diameter: 1 nanometer). Its ends 814 and 815 are coated with vitrified carbon and connected by hoop fitting to the rings 87 and 86 respectively. The rings 86 and 87, in the form of bellows, are of a titanium alloy of type TA6V of PECHINEY, with the addition of 6% of aluminum and 4% of vanadium. This material is chosen for its thermo-mechanical characteristics and its good resistance to corrosion in media which do not include NaCl. The housing 813 is of identical composition, which overcomes corrosion problems and facilitates assembly of the rings with the housing by welding.

The main properties of each ring and of the element are:
outer diameter of the cylindrical vitreous carbon seat of the element at 20° C.: 32.000 mm±0.003 mm
coefficient of expansion of carbon $5.10^{-6}/°$ C.
surface roughness of the finished cylindrical vitreous carbon seat: Ra=0.2 μm
width of the vitreous carbon cylindrical seat: 4 mm
temperature of assembly of the vitreous carbon end: 20° C.
internal diameter of the cylindrical seat of the TA6V ring at 20° C.: 31.930 mm±0.003 mm
surface roughness of the cylindrical seat of the ring before assembly: Ra=0.5 μm
coefficient of expansion of the alloy TA6V: $10.10^{-6}/°$ C.
elastic limit: 900 MPa
stress relaxation temperature: 730° C.
temperature of assembly of the ring: 270° C.

The main properties of this joint are:
separation force at 20° C. of the housing-ring joint: greater than 5000 Newtons
maximum temperature in use: 400° C.; above this value the gripping force becomes insufficient to fulfil the required functions of sealing and mechanical strength.

This manner of connection by hoop fitting carried out a relatively low temperature compared with the sintering temperature of the membrane has the advantage of not involving any modification of the layers or membranes with which the element is coated. Such modification can be produced when procedures such as sputtering molten matter are used, of the Schoop metal or ceramic spraying type, because of the heat transfer caused by the flame.

With this type of module it is possible to implement membrane separators for separating gases or liquids. The module is more particularly useful, following the principle of cross-flow filtering, to the extraction of heavy asphaltenes in fuel or residues in super-critical temperature and pressure regions (around 230° C. and around 25 bars). The module can equally be used for regenerating cracking catalysts by the same principle of cross-flow filtering by an element coated with an 0.2 μm membrane. The temperature and pressure operating conditions are substantially higher than in the preceding case.

Figure 9:
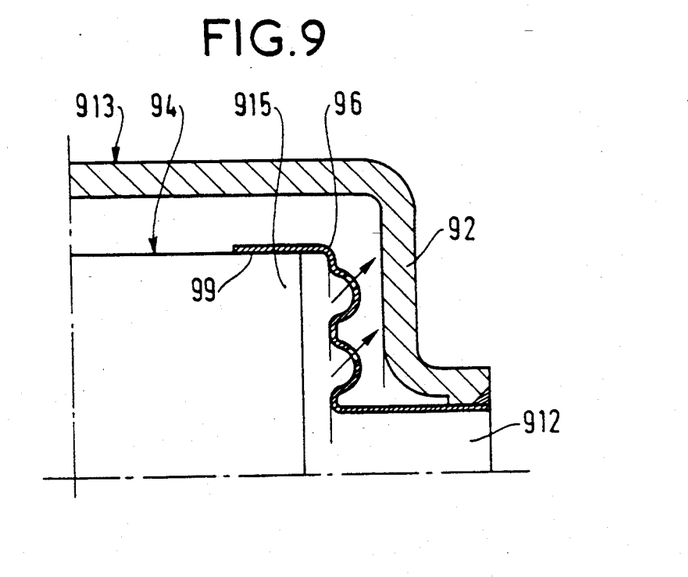
FIG. 9 shows a variant of the housing-ring-element connection of FIG. 8.

In FIG. 9 there is shown a variant of the housing-ring-element connection where assembly is effected by a ring 96 hoop fitted on the cylindrical seat 99 at the end 915 of the treatment element 94. This ring 96 is itself welded on the part 92, forming the transverse surface of the housing 913, in the region of the opening 912 on the axis of the module.

In other variants of the connection shown in FIG. 9 where the ring 96 is connected to the housing 913 at the transverse surface in the region of the opening 912, the assembly between the housing and several treatment elements is effected by rings hoop fitted on the connecting pieces carried by the ends of the elements, these rings being themselves welded or rolled into a perforated plate serving as a transverse partition in the housing. This joint is applicable to gas separators, purifiers or filters of large size, comprising several elements of length in the order of a meter.

Figure 10:
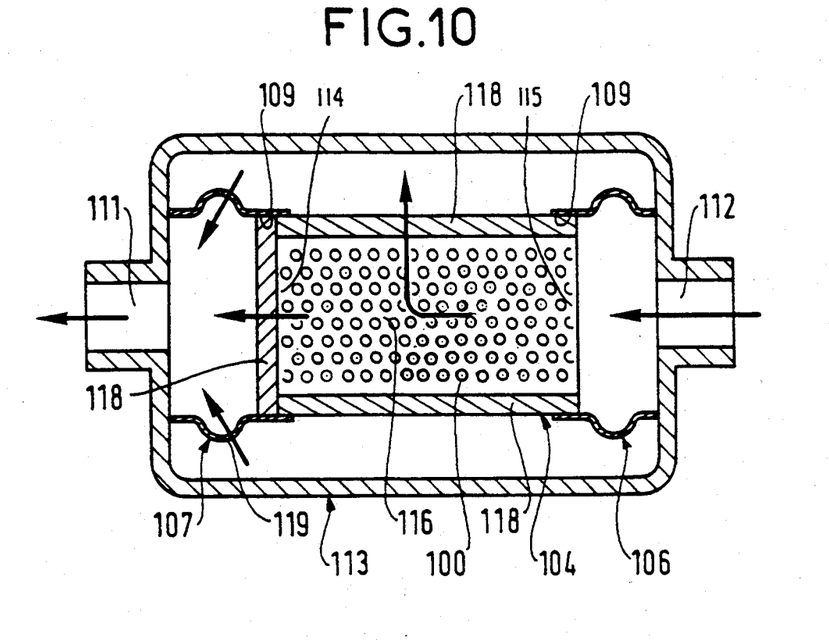
FIGS. 10 and 11 represent two variant embodiments of a gas purifying module of the invention for the case in which the treatment element includes a reactive component.

In FIG. 10 there is shown a gas purifier comprising a tubular element 104 with a porous wall 118, of which the internal channel 116 contains compounds 100 which react chemically with certain impurities in the gas, to fix or neutralize these. Each end 114 and 115 of the element 104 comprises a cylindrical seat 109, on which seats rings 107 and 106, in the form of Hastelloy C22 bellows are hoop fitted. The ring 107 has an opening 119 for passage of the gas. The rings 106 and 107 are themselves welded to the housing 113, made of the same C22 material. On the axis of the module there are an inlet opening 112 and an outlet opening 111 for the gas. The flow of gas in the module is shown by arrows.

In this variant of the concept of a module of the invention, the gas to be treated enters the module through the opening 112, sweeps through the reactive material 100 in the internal channel 116 of the element 104, passes through the porous wall 118 of the element 104, and then leaves the module through the opening 111, directly or after having passed through the ring 107 by way of the opening 119.

The main properties of each ring and of the element are:
mean diameter of the element pores: 12 μm
outer diameter of the cylindrical seat of the element: 32.000 mm±0.003 mm
coefficient of expansion of the alumina: $7.10^{-6}/°$ C.
surface roughness of the cylindrical seat: Ra=0.8 μm
width of the cylindrical seat: 5 mm
temperature of assembly of the ceramic element: 20° C.
inner diameter of the Hastelloy C22 ring at 20° C.: 31.910 mm±0.003 mm
surface roughness of the cylindrical seat of the ring before assembly: Ra=0.4 μm
coefficient of expansion of C22: $14.10^{-6}/°$ C.
temperature of assembly of the ring: 250° C.
temperature of use above which the gripping stress becomes insufficient: 350° C.

Figure 11:
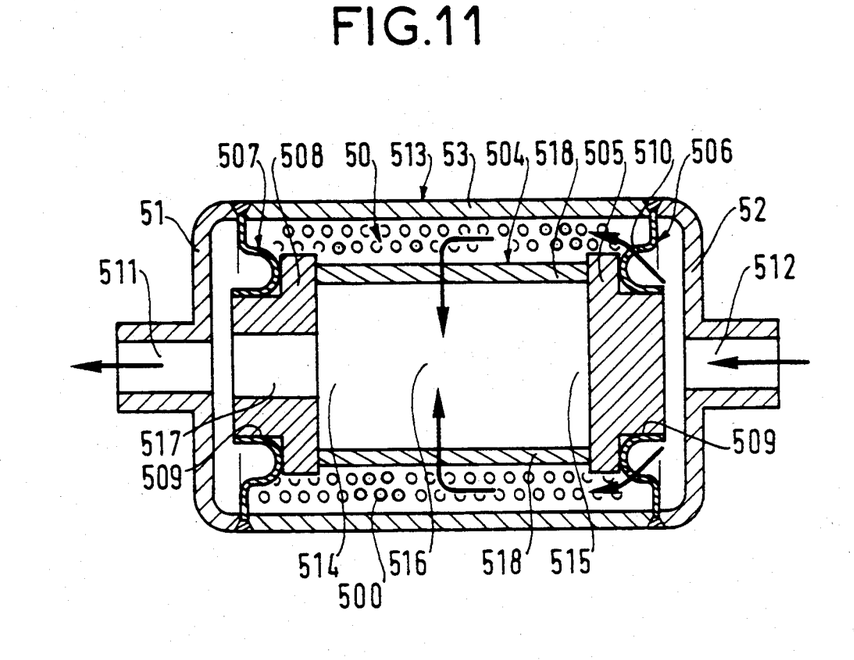

A gas purifier of a different conception is shown in FIG. 11. The reactive compounds 500 are outside the porous element 504, which has the form of a hollow cylinder with a porous wall 518 and an internal channel 516. Each end 514 and 515 of the element 504 is fitted with a respective connecting piece 508, 505. The connecting piece 505 serves to plug the channel 516, while the connecting piece 508 has an opening 517 putting the channel 516 in communication with the outlet opening 511 on the axis of the module. The inlet to the module is effected through the opening 512, also on the axis of the module, at the other end. Each connecting piece 505 and 508 has a cylindrical seat 509 on which a ring 506, 507 respectively is hoop fitted. The ring 506 has an opening allowing the gas to pass. The rings 506 and 507 are also welded to the transverse surface of the housing 513 at the junctions between parts 51 and 53 and parts 52 and 53.

In this case, the gas to be treated enters through the opening 512 of the module, passes through the ring 506 by way of the opening 510, sweeps through the reactive medium 500 in the space 50 separating the treatment element 504 from the housing 513, passes through the porous wall 518 of the element 504, flows into the internal channel 516 of the element 504, and leaves through the opening 517 of the connecting piece 508, which communicates with the outlet opening 511 of the module.

The treatment element 504 is of porous ceramic, the connecting pieces 505 and 508 are of dense ceramic, the rings 506 and 507 are of Hastelloy C22. The housing 513 is made of the same material as the rings 506 and 507. This module further comprises a reactive substance 500 which is formed of alumina particles covered with platinum, disposed in the space 50 between the element 504 and the housing 513.

The main properties of each ring and of the element are:
outer diameter of the cylindrical seat of the element at 20° C.: 20.000 mm±0.003 mm
coefficient of expansion of the alumina: $7.10^{-6}$/° C.
surface roughness of the ceramic cylindrical seat: Ra=0.15 μm
width of the cylindrical seat: 5 mm
temperature of assembly of the ceramic connecting piece: 20° C.
inner diameter of the cylindrical seat of the ring at 20° C.: 19.940 mm±0.003 mm
surface roughness of the cylindrical seat of the ring before assembly: Ra=0.25 μm
coefficient of expansion of C22: $14.10^{-6}$/° C.
width of the cylindrical seat: 5 mm
temperature of assembly of the ring: 250° C.

The main properties of this joint are:
separating force of the connecting piece-to-ring connection at 20° C.: greater than 5000 Newtons
temperature of use above which the gripping stree becomes insufficient: 350° C.

Such a separation module using a porous membrane for retaining a catalyst bed can be used for catalytic reaction of gases, such as hydrogenation of benzene, which is carried out at around 260° C., a temperature at which the degree of conversion is in the order of 100%.

Figure 12A:
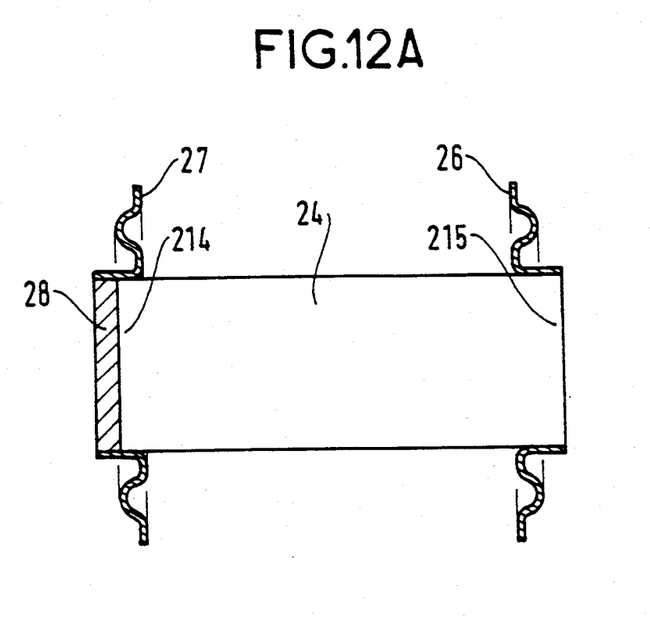
FIG. 12a is an enlarged view of a ring-element junction for the case in which there are two rings.
Figure 12B:
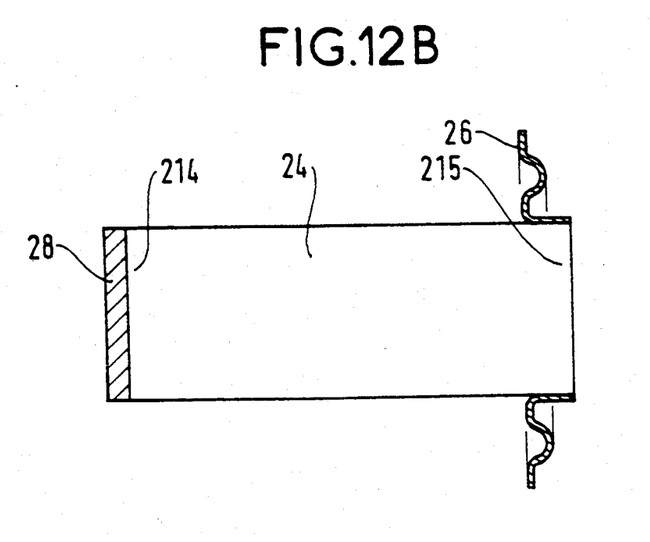
FIG. 12b is an enlarged view of the same ring-element junction for the case in which there is only one ring.

FIGS. 12a and 12b show an enlarged view of a ring-element connection for the case of an element 24 of which one end 214 carries a connecting piece 28.

In FIG. 12a, the element 24 is connected to two rings 26 and 27, one of the rings 26 is hoop fitted directly on the end 215 of the element 24, while the other ring 27 is hoop fitted on the connecting piece 28 carried by the end 214 of the element 24.

In FIG. 12b, a single ring 26 is hoop fitted directly on the end 215 of the element 24.

Figure 13A:
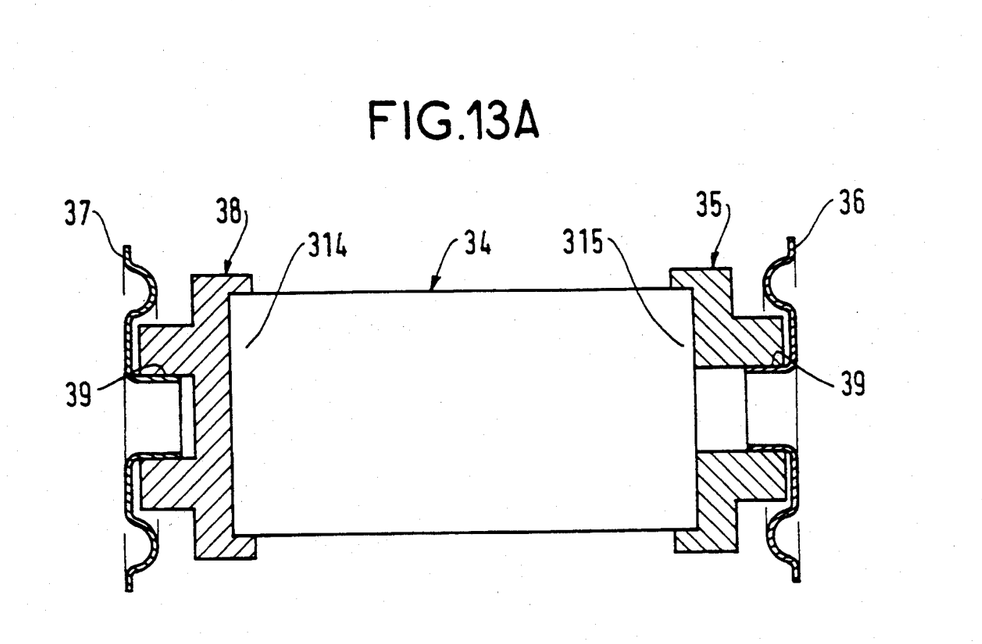
FIG. 13a shows an inverse hoop fitting ring-element connection.
Figure 13B:
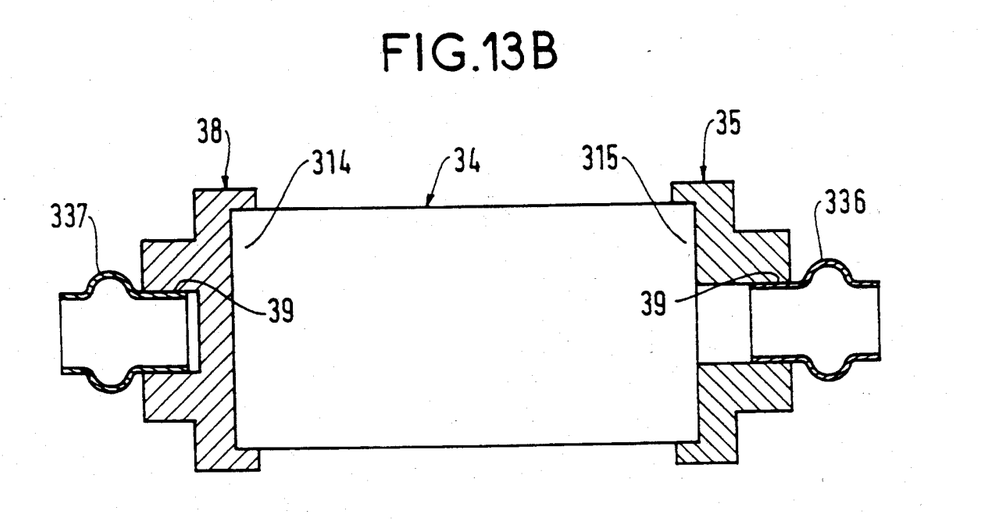
FIG. 13b shows another variant of an inverse hoop fitting ring-element connection.

FIGS. 13a and 13b show a type of ring-element connection by inverse hoop fitting, according to two variants of implementation.

In FIG. 13a, connecting pieces 35 and 38, located at each of the ends 314 and 315 of an element 34, are hoop fitted on the cylindrical seat 39 disposed on each of the rings 36 and 37. In so-called inverse hoop fitting, one part, the rings 36 and 37, is telescoped into a hoop here represented by the connecting pieces 35 and 38. The rings 36 and 37 are also fixed in a direction perpendicular to the axis of the element.

FIG. 13b shows inverse hoop fitting of two rings 336 and 337 in connecting pieces 35 and 38 with a cylindrical seat 39, located at the ends 314 and 315 of the element 34. The rings 336 and 337 are also fixed in a direction parallel to the axis of the element.

Figure 14:
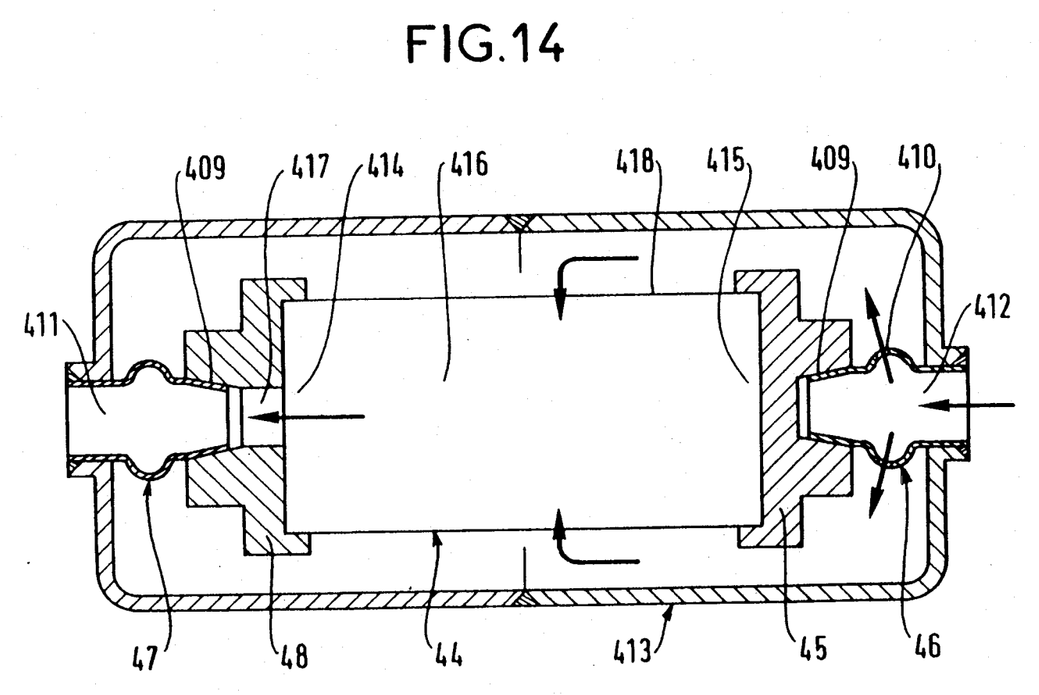
FIG. 14 shows schematically a ring-element connection by force fitting of Morse tapers.

FIG. 14 shows a module which comprises a tubular treatment element 44 having an internal channel 416 and a porous wall 418, attached by mechanical hoop fitting to rings 46 and 47 of slightly tapered form. The ring 46 has an opening 410 allowing the passage of a fluid. The ends 414 and 415 of the element 44 are each fitted with a connecting piece 45, 48 respectively, in which the passage has the same shape as the rings 46 and 47. The connecting piece 45 serves to plug the internal channel 416 of the element 44, while the connecting piece 48 is provided with an opening 417 which places the internal channel 416 in communication with the outlet opening 411 of the module. The hoop fitting of the connecting pieces 45 and 48 on the tapered seats 409 of the rings 46 and 47 is effected by force fitting two tapers, of Morse taper type, i.e. with a half cone angle around 1.5 degrees. The rings 45 and 48 are also welded to the housing 413 in the region of the inlet and outlet openings 412 and 411 respectively, located on the axis of the module.

The fluid, whose flow is shown by arrows, enters by the opening 412, passes through the ring 46 by way of the opening 410, flows along the outer lateral surface of the element 44, passes through the wall 418 and is directed towards the end 414 as it follows the internal channel 416, finally passing out through the opening 417 of the connecting piece 48 and leaving by the opening 411 at the other end of the module.

The present invention is obviously not limited to the embodiments described and shown but can be subject to numerous modification available to the person skilled in the art, without leaving the spirit of the invention.

We claim:

1. A module for filtering, separating and purifying fluids such as gases or liquids, or for catalytic conversion, comprising:
a substantially cylindrical stainless steel metal housing having an electro-polished interior,
at least one rigid treatment element, which is placed inside said housing, which has opposite ends and which is porous and is made from a material selected from a group consisting of a ceramic, carbon and sintered metal, wherein at least one of said opposite ends carries at least one of connecting pieces which is substantially cylindrical, and which has an axis parallel to that of the housing, wherein said connecting piece is dense and is made from said material,
at least one nickel-rich metal part in the form of an elastically deformable ring which is welded to said housing and which also is connected to said connecting piece, and
a connection, between said ring and said connecting piece, comprising a thermal or mechanical hoop fitting, said ring being hoop fitted on said connecting piece or vice versa.

2. The module according to claim 1, wherein said ring is fixed to said housing by welding effected by fitting an outer edge of said ring in a machined seat in a wall of said housing and by partial fusion of the thickness of the wall of said housing and of the outer edge of said ring, without a region of fused metal appearing at an inner surface of said housing.

3. The module according to claim 1, wherein said ring is fixed to said housing by welding effected by fitting an outer edge of said ring in a machined seat in a wall of said housing and by partial fusion of the thickness of the wall of said housing, without fusion of the outer edge of said ring but with gripping of said edge by contraction of the fused region, and without a region of fused metal appearing at an inner surface of said housing.

4. The module according to claim 1, wherein said connecting piece is connected to said element by a glass which is fusible at a high temperature.

5. The module according to claim 1, wherein the connection between said ring and said connecting piece is effected by mechanical hoop fitting of Morse tapers.

6. The module according to claim 1, wherein said element contains components which can react chemically with some constituents of the fluid to be treated.

7. The module according to claim 6, wherein said treatment element is a multi-channel treatment element with a membrane of sterilizing type, with a hydrophobic surface and having a pore diameter less than or equal to 0.8 micrometers.

* * * * *